Sept. 3, 1957     A. D. K. LAIRD     2,805,339

FLUID ABSORPTION COMPARATOR

Filed March 7, 1955

INVENTOR.
ALAN D. K. LAIRD
BY
Townsend, Townsend and Hoppe
ATTORNEYS

United States Patent Office 2,805,339
Patented Sept. 3, 1957

2,805,339
FLUID ABSORPTION COMPARATOR
Alan D. K. Laird, Lafayette, Calif., assignor to The Regents of the University of California, Berkeley, Calif., a corporation of California Application March 7, 1955, Serial No. 492,724
4 Claims. (Cl. 250—43.5)

This invention relates to a new and improved calibration device. More particularly, the invention relates to a device for calibrating apparatus measuring the absorption of a fluid of electromagnetic waves, such as X-radiation and the like.

At the present time, measurement apparatus is employed which operates upon the principle of absorption of energy as it passes through an absorbing medium. The present invention has its principal use in the calibration of such equipment. The absorption of energy from a beam of electromagnetic waves, such as light or X-rays, by an absorber depends upon the length of the path of the beam through that absorber. If radiant energy is produced, passed through various absorbers and is finally metered, any change in absorber thickness in a direction parallel to the direction of the beam will change the meter indication. This phenomenon has been applied to measuring the thicknesses of metal or other sheets and to measure the liquid content of porous material.

Heretofore, the system which has been used to identify the absorber thickness which a given meter reading signifies, has been to set up operating conditions which duplicate the other operating conditions of the test sample with the exception of the sample to be gauged. In place of the sample, several similar pieces having different known thicknesses are inserted in turn and the respective metering indications are noted. The meter indications are then identified with known dimensions of materials similar to the samples gauged in actual operation and the equipment is then calibrated. Then during operation, a meter indication shows the dimensions of the sample being gauged. This calibration can be extremely tedious in many cases.

The calibration equipment used for sheets of solids of various thicknesses in materials may comprise shims or wedges which are tapered at a slight angle. For liquids, the shim or wedge idea is carried over into the use of vessels of various thicknesses which may have parallel walls or tapered walls which contain the liquid being measured. Such vessels must be carefully made and stored and cause considerable bother when frequent calibrations are necessary. Furthermore, it is necessary to provide racks for storage of such vessels.

The present invention is designed to eliminate the multiplicity of vessels by providing two vessels or pots of variable thickness mounted back to back and so constructed that either or both of the vessels may be filled with liquid and by adjustment of the apparatus, the thickness of the liquid may be continuously varied to any desired value by turning one or two thimbles or nuts. By use of this apparatus, the effect of changes in one or both of the absorbers in the presence of the other can be measured conveniently.

A typical application of the invention is in the measurement of three components contained in a sample of porous rock wherein two of the components may be liquid and one gas. Since strong X-ray absorbing compounds with pronounced absorption edges may be added to the liquids in some cases, and since precision in the calibration is required, many combinations of vessel thicknesses would be required in accordance with the commonly used prior practice. The porosity of the rock may vary within two percent or so, thereby requiring a corresponding variation in the basic thickness dimension of the vessels. By reason of the fact that the sum of the thicknesses of the two vessels containing liquid must be the same as the effective thickness of the pore space of the rock for complete liquid saturation of the rock, and since this is an important condition during the experiments, it is necessary to increase the number of the vessels many times in accordance with prior practice. Furthermore, the manufacture of vessels with dimensional stability and accuracy required is very difficult and expensive. Hence the present invention obviates the necessity of providing a large number of vessels of different thickness.

Another feature of the invention is the fact that provision is made for filling, emptying and cleaning each of the pots separately through a hole in the top of the apparatus.

Another feature of the invention is the fact that gauge blocks may be inserted through the hole so that the calibration may be checked without removing the fluid from the cells, it being understood that the fluid may be liquid or gaseous. In the case of gaseous fluids or volatile liquids, it is necessary to plug the top hole to prevent escape.

Accordingly, the present invention makes practical the measurement not only of two components, but also of three components saturating the porous medium by providing a convenient means of calibrating the absorption indications.

A further feature of the invention is that its construction greatly reduces the large number of the equipment required to perform the calibration.

Although as hereinafter illustrated and described, there are two calibration pots placed back to back, it will be understood that it is a simple matter to make as many vessels as needed and to mount them together. It will also be understood that the vessels may be made pressure-tight to hold volatile fluids. It will further appear that powdered solids may also be employed.

Other objects of the present invention will become apparent upon reading the following specification and referring to the accompanying drawings in which similar characters of reference represent corresponding parts in each of the several views.

In the drawings:

Fig. 1 is a front elevation of the device;

Fig. 2 is a top plan thereof;

Fig. 3 is a horizontal section taken substantially along the line 3—3 of Fig. 1; and Fig. 4 is a vertical section taken substantially along the line 4—4 of Fig. 3.

As has been stated, the present apparatus comprises two substantially identical calibration pots placed back to back. The dividing wall between the two pots is center plate 11, preferably made of Lucite or similar material, which is relatively non-absorbent to X-radiation. The center plate 11 comprises a means for mounting the apparatus and adjusting its position relative to the beam used in the calibration. Accordingly an upwardly projecting lug 12 is formed on the top of the plate 11 and a depending bottom projection 13 at the bottom. Support rods 14 are attached to the bottom projection 13 and other supports (not shown) are attached to the lug 12 whereby the elevation of the plate 11 may be adjusted.

On each side of the center plate 11 is an annular flange member 16, the flange member on one side being designated 16a and the flange member on the other side being designated 16b. Projecting outwardly from the center plate 11 in a direction opposite that of the plate 11 is an integral, exteriorly threaded collar 17. The two flanges 16a and 16b are attached to the plate 11 by means of a counter-sunk screw 18, counter-sunk into the flange 16b and passing through apertures in the plate 11 and in threaded engagement with a taphole 19 in the opposite plate 16a. As shown in the accompanying drawings, there are seven such screws 18 provided. The top of each flange 16a and 16b is cut away in a hole 21, which provides access to the interior of the device on either side of the plate 11. By means of the aperture 21 liquid may be added to or withdrawn from either side of the device. In addition, as hereinafter explained, calibration blocks may be inserted through this hole.

Each side of the device is substantially identical and hence for purposes of explanation the construction of only one side need be set forth. The exteriorly threaded collar 17 is in threaded engagement with interiorly threaded thimble or adjustment nut 22, which thimble is provided with a central aperture 23. The margins of the aperture 23 are in registry with the inner bore of inwardly directed annular projection 24. Within the aperture 23 fits an annular window bushing 26, the inner end of which has a flange 27 which abuts the inner edge of the projection 24 and fits firmly thereagainst. The bushing 26 is held in place by annular retainer ring 28 which is held in place by a plurality of screws 29 threaded into bushing 26, the outer diameter of ring 28 engaging the inner edge of the central aperture 23 in thimble 22. A neoprene washer 28a is interposed between bushing 26 and ring 28 to provide for adjustability of tightness of fit in the apparatus. Cylindrical central bore 30 in bushing 26 is the passage through which the X-rays or other radiation enters the device. A guide pin 31 projects radially outwardly from the flange 27 of bushing 26 and the outer end of the pin 31 is received in a slot or keyway 32 in the inner bore of the collar 17. Hence rotation of thimble 22 on threaded collar 17 produces longitudinally inward and outward movement of bushing 26 relative to collar 17, inasmuch as rotation of bushing 26 is prevented by engagement of guide pin 31 in slot 32. The inner end of bore 30 in bushing 26 is closed off by a window 33 which is formed of Lucite or similarly relative non-absorbent material. Window 33 is held in place on bushing 26 by means of a plurality of screws 34 which are threaded into bushing 26 and are recessed by means of counter bores in the inner surface of window 33.

An annular diaphragm 35 is positioned to close off the space between window 33 and plate 11 so that the space between the window and plate may be filled with a fluid. Such a diaphragm 35 is substantially annular in shape, its inner edge clamped between window 33 and flange 27 of bushing 26, screws 34 tightening the window against the bushing and forming a fluid-tight seal. The outer edge of the diaphragm 35 is clamped between the plate 11 and the flange 16a or 16b and is held in tight relationship by screws 18. Accordingly as thimble 22 is turned, and accordingly as window 33 is advanced toward or retracted from plate 11, the liquid trapped between the diaphragm 35 and the plate 11 may adjust to the particular dimension between the two movable parts. It will be further understood that the cutout 21 in the flange 16 communicates with the space inside the diaphragm 35 so that the diaphragm may be filled with fluid through the hole 21 or the fluid may be withdrawn, as required. It is further apparent that accurate measuring blocks may be inserted through the holes 21 to measure accurately the distance between the window 33 and plate 11 in the manner of conventional gauge blocks. Such insertion and withdrawal of the blocks may be accomplished without the necessity of removing the liquid which is inside the diaphragm 35.

The exterior of the thimble 22 is suitably calibrated by means of calibration marks 36. Readings on the marks 36 are obtained by means of stationary indicators 37, which are attached to the flanges 16a and 16b. The fineness of the reading may be varied by variation in the pitch of the threads of the collar 17 and thimble 22, and by the spacing between the markings 36.

To spring load the device and afford reliability of the calibrations of the instrument, a spring may be employed to bias nut 22 inwardly or outwardly. One means for accomplishing this result is the provision of an annular groove 41 on the outer edge of collar 17 and a helical spring 42 partially fitting in the groove 41 and bearing against nut 22. Spring 42 biases nut 22 outwardly and overcomes lost motion in the threads of the collar 17 and nut 22.

In use, the device is supported by means of support rods 14 and other means not shown in the path of radiation, transverse to the direction of the radiation beam. The beam passes through bore 30 and bushing 26 in one side of the device and thence through Lucite window 33, thence through the liquid which is trapped inside the diaphragm 35, thence through the center plate 11, thence through the liquid trapped within the other diaphragm, thence through the opposite window 33 and out through the opposite bore 30. By separate adjustment of the thimbles or nuts 22, the thickness of the liquid in each side of the device may be accurately adjusted, the one adjustment being independent of the other.

The liquid is filled through the gap 21 in the top of the flange 16, each side being filled and emptied independently.

When required, the distance between the window 33 and plate 11 may be checked by inserting an accurate measuring block through the hole 21 without disturbing the liquid inside the diaphragm 35.

Either cell may be removed if only one fluid is needed in a particular calibration, particularly in the event that saving of space is important.

I claim:

1. A fluid absorption comparator comprising a radiation transmitting base plate, means for mounting said plate in the path of a beam, a first chamber-forming means on one side of said base plate comprising an annular threaded flange projecting from one side of said base plate, a nut in threaded engagement with said flange, said nut being apertured, a bushing in the aperture of said nut, means for restraining rotation of said bushing as said nut is turned, means for moving said bushing relative to said base plate as said nut is turned, a radiation transmitting window parallel to said base plate closing off the inner end of said bushing, an annular diaphragm sealed at its outer edge between said flange and base plate and at its inner margin between said window and bushing.

2. A comparator according to claim 1 which comprises second chamber-forming means substantially identical with said first chamber-forming means and on the opposite side of said base plate therefrom, whereby the thicknesses of fluids in the path of radiation through said windows and base plate may be independently varied.

3. A comparator according to claim 2 in which is provided independent calibration means for the nuts of each said chamber-forming means.

4. A fluid absorption comparator comprising a radiation transmitting base plate, means for mounting said plate in the path of a beam, a first chamber forming means on one side of said base plate, and a second chamber forming means on the opposite side of said base plate; each said chamber forming means comprising a threaded member and a nut engaging said threaded member, said nut being apertured, a radiation transmitting window closing the aperture in said nut, said window being substantially aparallel to said base plate, and an annular diaphragm sealed along one edge to said base plate and at its other edge to said nut.

References Cited in the file of this patent

UNITED STATES PATENTS 2,690,695    Coates _____ Oct. 5, 1954

OTHER REFERENCES

"Variable Path-Length Cell etc.," by Gordon et al., from Journal of Scientific Instruments, vol. 22, January 1945, pp. 12, 13, 14.